(12) United States Patent
Sundström et al.

(10) Patent No.: US 7,346,619 B2
(45) Date of Patent: Mar. 18, 2008

(54) METHOD AND SYSTEM FOR STORING DATA

(75) Inventors: Bengt Sundström, Göteborg (SE); Birger Tollefsen, Halden (NO)

(73) Assignee: Resource Management Techniques, Gothenburg (SE)

( * ) Notice: Subject to any disclaimer, the term of this patent is extended or adjusted under 35 U.S.C. 154(b) by 330 days.

(21) Appl. No.: 10/220,201

(22) PCT Filed: Feb. 28, 2001

(86) PCT No.: PCT/SE01/00429

§ 371 (c)(1), (2), (4) Date: Aug. 29, 2002

(87) PCT Pub. No.: WO01/65407

PCT Pub. Date: Sep. 7, 2001

(65) Prior Publication Data

US 2003/0126145 A1    Jul. 3, 2003

(30) Foreign Application Priority Data

Feb. 29, 2000    (SE)    .................... 0000647

(51) Int. Cl.
- *G06F 7/00* (2006.01)
- *G06F 17/00* (2006.01)
- *G06N 7/00* (2006.01)
- *G06N 7/08* (2006.01)

(52) U.S. Cl. .................. 707/100; 707/101; 707/102; 707/103 R; 706/55

(58) Field of Classification Search ............ 707/102, 707/103; 706/48
See application file for complete search history.

(56) References Cited

U.S. PATENT DOCUMENTS

| | | | | |
|---|---|---|---|---|
| 4,885,717 A | * | 12/1989 | Beck et al. ................. | 717/125 |
| 5,379,366 A | * | 1/1995 | Noyes ......................... | 706/55 |
| 5,761,655 A | * | 6/1998 | Hoffman ....................... | 707/4 |
| 5,787,234 A | * | 7/1998 | Molloy ......................... | 706/46 |
| 5,864,858 A | * | 1/1999 | Matsumoto et al. ........ | 707/100 |
| 6,411,957 B1 | * | 6/2002 | Dijkstra ...................... | 707/100 |
| 6,754,666 B1 | * | 6/2004 | Brookler et al. ........... | 707/102 |
| 2005/0055363 A1 | * | 3/2005 | Mather ....................... | 707/102 |

FOREIGN PATENT DOCUMENTS

| | | |
|---|---|---|
| EP | 0961211 | 12/1999 |
| WO | 99/31606 | 6/1999 |

OTHER PUBLICATIONS

Nadkarni, P.M., et al. "Organization of Heterogeneous Scientific Data Using the EAV/CR Representation", Journal of the American Medical Informatics Association: Jamia (online) vol. 6, No. 6, Nov. 1999, pp. 478-493.

* cited by examiner

*Primary Examiner*—Wilson Lee
*Assistant Examiner*—Cheryl M Shechtman
(74) *Attorney, Agent, or Firm*—Harness, Dickey & Pierce

(57) ABSTRACT

A method is universally applicable, enabling storing all types of data and structures of data. The method is based on structure elements being self-contained information carriers, represented by pairs of concept and concept value and associated context information. Using the method, data can be organised in hierarchies of structure elements with arbitrary depth and complexity. In spite of its simplicity, the method can reflect connection, context and meaning, however complex, irrespective of types of data and how complex the relations between data may be. Hence, the method represents a fundamental framework for standardised physical data storage of all types of data.

43 Claims, 1 Drawing Sheet

METHOD AND SYSTEM FOR STORING DATA

This application is the National Phase under 35 USC §371 of PCT International No. PCT/SE01/00429 which has an International filing date of Feb. 28, 2001, which designated the United States of America and which claimed priority on Swedish application number 0000647-8 filed Feb. 29, 2000, the entire contents of which are hereby incorporated herein by reference.

TECHNICAL FIELD

The present invention generally concerns a method for defining, storing, retrieving and interpreting data, as well as a database system, in which data is stored according to the method described.

BACKGROUND OF THE INVENTION

Electronic data processing requires storing structures of data. In general, such data stored in such structures is called a DATABASE. A number of methods are available for this purpose. Most such methods assume a predefined structure type called RECORD. A record describes an object or an event with a number of ATTRIBUTES connected with it. An attribute is a concept expected to receive contents. According to tradition the attributes are contextually connected with a record type and hence are not self-contained carriers of information. In a database, data is stored according to record definitions. Each record type reflects a LOGICAL FILE to contain objects or events being described according to the record definition. A database is a set of such files, fulfilling a certain purpose. A DATABASE SYSTEM is a set of general methods, preferably implemented with programmed software, with the purpose of defining, maintaining, retrieving, and, to some extent, interpreting data in a database.

A common feature of most database systems is that they effectively can access data on the computer's SECONDARY DATA STORAGE (e.g. hard disk). The secondary data storage of a computer uses BLOCK-addressing when accessing data, and is suitable for permanent storing of data. To obtain effective use of secondary data storage, the possibilities of modifying the database definitions must be restricted.

Some structure types are not suitable for traditional database systems. They depend on the computer's PRIMARY DATA STORAGE (e.g. Random Access Memory) to obtain effective access to data. The primary data storage is BYTE-addressed and very fast. However, the primary data storage is not suitable for large databases or permanent data storage. DYNAMIC RECORD TYPES is an example of such data types. A dynamic record type can be defined and redefined without affecting existing programs or data. For this type of structures, access mechanisms and context are normally implemented as part of the application program. To achieve effective access to such data, all data need to be accessed in the primary data storage, whereas the secondary data storage is exclusively used for permanent storing of the data.

Program products storing large quantities of data need to access data in the secondary data storage. For this reason they are limited to fixed record definitions. Hence, in the process of meeting needs for increased software functionality, record definitions have to be enlarged and associated procedures have to be updated or added successively. For this reason standard software tends to get out of proportion. This phenomenon is well illustrated by standard application software for business administration (Business systems). The software flexibility is increased by adding new program modules, each reflecting a new aspect of the business. However flexible the software, the user has to comply with the software properties and limitations. The possibilities of adjusting the software to suit the needs of the user are truly limited. Large portions of the business rules are predefined in the software and can be developed only marginally. Many phenomenona appearing naturally in a certain business are excluded from being described within the frame of the software.

A solid reason for this is that the basis for describing objects, events and the domain of rules is determined by the predefined data structure and the corresponding software. Therefore, a more flexible system for physical storing of data, less dependent on predefined data structures and procedures is desirable.

Further, the current methods for storing data occupy large memory space, as the storing density normally is very low. This is due to the fact that the record definitions are excessive in comparison with the needs of the user.

Other problems with the current database systems are long data retrieval times, difficulties with modifications of the database and the interface to it. Further, combining data from different databases is complicated.

SUMMARY OF THE INVENTION

An object of an embodiment of the invention is to provide a method for defining and storing data, and data retrieval as well as a corresponding database system, which wholly or partly eliminates a problem in the prior-art methods.

An embodiment of the invention concerns a method for defining, storing, retrieving and interpreting data, in which data is represented in self-contained carriers of information, called structure elements, comprising a data element which in turn comprises a concept (CPT) and a concept value (INS), the structure elements being stored in a structure element file. Particularly, the structure elements further are assigned an identification element (SID), enabling unique identification of structure elements, and at least some structure elements are assigned a position element (OWN; ATR; SRT), determining the context of the structure element. An embodiment of the invention also concerns a corresponding database system.

File shall here be understood in such manner that it can be stored physically on an arbitrary block-addressable data storage, such as a commercially available secondary data storage. Further, several files can be stored in one physical device.

An embodiment of the invention offers a flexible and effective method for storing and retrieving data, and it offers a number of advantages compared with prior-art methods. Among other things, an embodiment of the invention offers a very compact database with high data density, the memory space being effectively utilized, and, in particular an embodiment of the invention enables effective data storing and retrieval on a block-addressable storing device. Further the method is universally applicable and the structure elements are independent of data types. Further, with an embodiment of this invention it is simple to define and redefine concepts and concept structures, e.g. "Data Dictionary". The Data Dictionary can be expanded while an application using it is in operation, whereas the database is totally dynamic and governed by actual needs. Hence, an embodiment of the invention enables defining and developing, among other things, dynamic record types with no need for reorganizing data or modifications of existing software programs using the data. The method according to an embodiment of the invention offers a number of entries for structure element retrieval.

Further it is preferred to store data in files for text elements and accelerator elements. These additional elements are stored, preferably, as flat tables, i.e. not hierarchically, each in its own file, reflecting portions of the information stored in the hierarchic structure element file. These complementary elements facilitate enhanced data interpretation and faster retrieval and processing.

Particularly the text elements preferably comprise text associated with data stored in the corresponding structure element(s). As a result, the text elements are well suited for presenting structure element data that requires a textual interpretation. Further, the text file can be used as a retrieval path to the structure element file.

Particularly the accelerator elements preferably comprise clusters of data from several structure elements, enabling effective data retrieval in the structure element file based on compound conditions represented by the content in two or more structure elements.

Software using data stored according to an embodiment of the invention can hereby establish a set of concepts and concept values, interpretable by the software. Further, the domain of concepts can be developed with contents and associated procedures within frames determined by the software. This makes it possible to develop general tools for application system development.

BRIEF DESCRIPTION OF THE DRAWINGS

Further advantages and distinctive features of the invention will be seen in the claims and the description of preferred embodiments.

The enclosed drawing shows in FIG. 1, a block diagram of the logical relations between the element files according to a preferred embodiment of the invention.

DETAILED DESCRIPTION OF PREFERRED EMBODIMENTS

Figure 1:
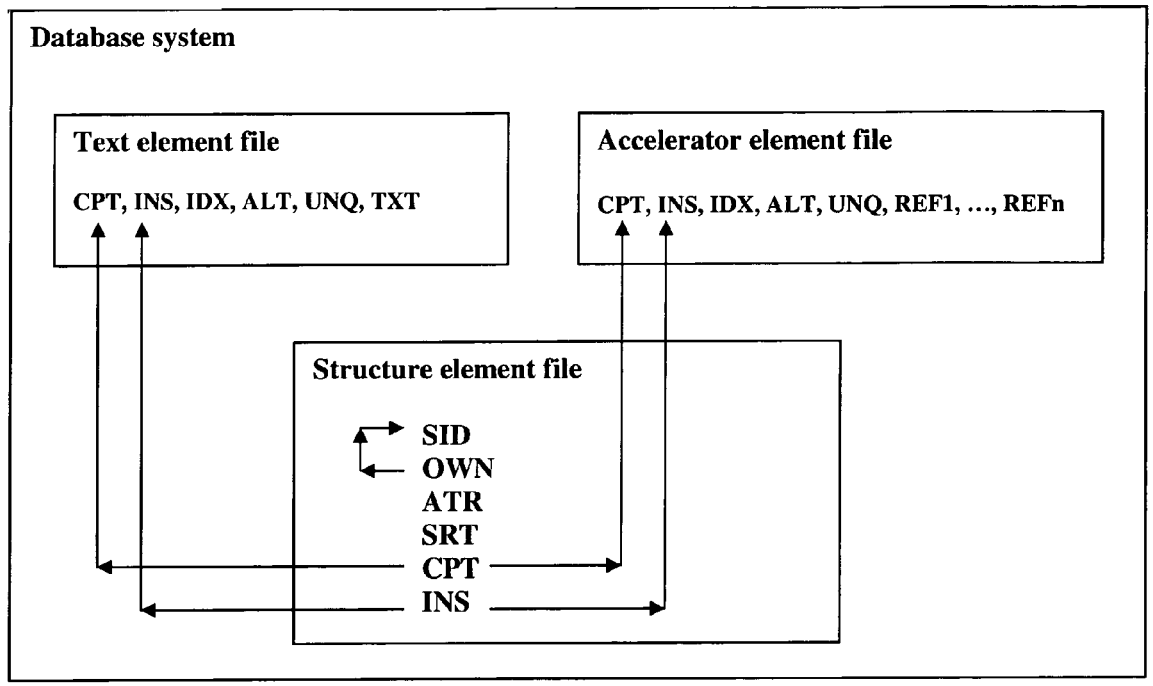

An embodiment of the invention concerns a method for defining, storing, retrieving and interpretation of data, and a corresponding database system, to be built according to the method of an embodiment of the invention.

A fundamental property of an embodiment of the invention is regarding data as pairs containing a concept and a concept value (Concept;Value). Thus, every structure element becomes a self-contained information carrier. Example: (PERSON; "Adam Smith") and (AGE; 54). Such structure elements can be connected vertically in Parent/Child-relations, where the Child-element can be interpreted as an attribute of the Parent-element. Thus a hierarchic context-structure is created. Thus, in the example above (PERSON; "Adam Smith") has the attribute (AGE; 54), that is, (AGE; 54) dwells in the context (PERSON; "Adam Smith"). Hence, a record, as used by conventional database systems, using an embodiment of the invention can be replaced by a concept represented by a structure element, having one or more structure elements connected to it as attributes. The method according to an embodiment of the invention allows such structures of arbitrary vertical depth, and it allows likewise an arbitrary number of different attributes on each vertical level, and it allows an arbitrary number of values of each attribute on each level.

The Structure Element

Hence, according to an embodiment of the invention, data is arranged in such self-contained structure elements, which are stored in a structure element file as shown in FIG. 1. A structure element comprises a data element, and this in turn comprises a concept, CPT, and a concept value, INS. Further, the structure element comprises an identification element, SID, being the primary key for the structure elements, enabling unique identification.

Further a structure element comprises a position element, used for creating and interpreting relations between structure elements. In this way contexts are created. The first part of the position element, OWN, contains information concerning vertical relations between structure elements, and a hierarchy of structure elements can be created. The OWN-property of a structure element contains the SID of its Parent-structure element.

Further, the position element contains a second part containing information concerning horizontal relations between structure elements, denoting the relations between structure elements on the same hierarchic level. This second part comprises two horizontal position properties, a primary positioning, ATR, that can be interpreted as attribute and a secondary positioning, SRT, that can be interpreted as an attribute-value positioning. The position properties organise the structure elements in the structure element file on each level of the structure element hierarchy.

The last property, SRT, can preferably be used for validating different values of an attribute using context defined by other structure elements. Such an application of the invention is illustrated in the example below.

Hence, the structure elements have six (6) properties, which can be divided in three (3) categories: Identification, Position (context) and Data. The structure element properties are shown in the table below, where the format preferably can be numeric:

| Field# | Field name | Explanation |
|---|---|---|
| 1 | SID | Structure element identity |
| 2 | OWN | Parent-concept SID. Vertical structure |
| 3 | ATR | Attribute. Primary horizontal position |
| 4 | SRT | Attribute value sequencing Secondary horizontal position |
| 5 | CPT | Concept |
| 6 | INS | Instance (concept content) |

The identification, SID, can preferably be an integer, identifying an occurrence and serving as a primary key for the structure element file. The vertical position property, OWN, contains the primary key to the Parent structure element. This property of the technique creates vertical Parent/Child relations. The first horizontal position property, ATR, can preferably be an integer ordering Child-elements, being used for ordering attributes. The second horizontal position property, SRT, can preferably be an integer ordering Child-elements with the same owner and attribute but with different values (INS) of the concept (CPT) declared for the attribute. This can be used for ordering multiple attribute values, often referred to as "repeating group".

The vector $\{OWN,ATR,SRT,CPT,INS\}=\{0,0,0,n,m\}$ is called a basic occurrence, which is the occurrence on the highest level of a hierarchic structure of concept CPT=n with the contents INS=m. All structure elements, being defined with attributes, text representation or accelerator representation, must have a basic occurrence. This will be described in more detail in the following.

Retrieval Mechanisms for the Structure File

There are several possible ways to retrieve individual structure elements in the structure element file as described above. One way, in the following called INDEX 0, is direct retrieval using the identification (SID) in Field# 1. An alternative, in the following called INDEX 1, is applying indirect retrieval via the vector {OWN, ATR, SRT, CPT, INS}, that is Field# 2, 3, 4, 5 and 6. Yet another alternative, in the following called INDEX 2, is applying indirect retrieval using the vector {CPT, INS, ATR, SRT, OWN}, that is Field# 5, 6, 3, 4 and 2.

The access mechanisms for the elements of the structure element file are limited by the properties of the structure elements as described above. Using the primary key (INDEX 0), it is easy to retrieve a Parent-element of a Child-element. INDEX 1 is an effective mechanism for finding Child-elements in the structure hierarchy. INDEX 2 is suitable for retrieving specific concepts and concept values traversing the structure hierarchy.

Further, the method according to an embodiment of the invention comprises two additional elements, completing the method. These elements will be described in more detail in the following.

Depending on the quantity of data and its character, the properties of the structure element may prove insufficient. In this case the TEXT ELEMENT or the ACCELERATOR ELEMENT, described below, can be used.

The Text Element

Data in the structure element file, best being represented by text, can conveniently be completed with text element(s) in the text element file. A text element is related to a basic occurrence in the structure element file, as described above and as shown in FIG. 1.

The only purpose of the text element is transforming the numeric representation of data in the structure element into a text representation. The text element, according to an embodiment of the invention is used to retrieve, order and present data in an alphanumeric format.

The access mechanisms of the text element should be programmed in such a way that text elements are stored and retrieved statically or dynamically. Static implies that references to text elements are predefined in the software. Dynamic implies that programs using the method according to the invention can accept instructions as to how to use text elements.

It should be noted that, to use text structurally, texts must be categorised with reference to concept definitions and be represented, preferably numerically, in the structure element file. This indicates that text element strictly is a mechanism for presentation and access.

For identification purposes, the text elements preferably comprise properties corresponding to those in the structure element. These properties are CPT and INS, identifying a basic occurrence in the structure file. The text element also preferably comprises a property to ensure uniqueness (UNQ) in the case where more than one basic occurrence in the structure file have the same text representation. The text elements also comprise a text property, holding the text representation (TXT). Other properties of the text element are an index (IDX) preferably used for defining several text representations to one structure element, and a property used for defining several text alternatives to a certain text representation (ALT).

The properties of the text elements, preferred terms and field sequence are presented in the following table, where the formats preferably can be numeric and alphanumeric:

| Field# | Fieldname | Explanation |
| --- | --- | --- |
| 1 | CPT | Concept |
| 2 | INS | Concept instance number |
| 3 | IDX | Text representation definition |
| 4 | ALT | Alternative text representations |
| 5 | UNQ | Optional for element uniqueness |
| 6 | TXT | Text representation |

Access Mechanisms for Text Elements

There are several ways to retrieve individual text elements of the text element file, as described above. One way, in the following called INDEX 1, is applying indirect retrieval using the vector {CPT, INS, IDX, ALT}, that is Field# 1, 2, 3 and 4. Another way, in the following called INDEX 2, is applying indirect retrieval using the vector {CPT, IDX, TXT, UNQ}, that is Field# 1, 3, 6 and 5.

The access mechanisms of the text file have the following purposes: INDEX 1 connects a basic occurrence in the structure element file with one or more text representations, whilst INDEX 2 is used for retrieving a basic occurrence in the structure element file using a text representation.

The Accelerator Element

To increase retrieval effectivity in the structure element file, the method according to the invention further comprises an accelerator element, referring to a number of attributes (direct context via the relation) or other structure elements (indirect context, preferably defined in the application). Together, the attribute references identify a basic occurrence in the structure element file. The accelerator elements are stored in an accelerator element file as shown in FIG. 1. The objective of the accelerator element is enabling a basic occurrence in the structure element file using references to data in several structure elements simultaneously. Using several structure elements, compound retrieval sets can be constructed. This reduces structure element retrieval time considerably.

In the same way as the text element, the access mechanisms of the accelerator element are to be programmed in such a way that accelerator elements are stored and retrieved statically or dynamically. Static implies that references to accelerator elements are predefined in the software. Dynamic implies that programs using the method according to the invention can accept instructions as to how to use the accelerator elements.

To enable structure element identification, the accelerator element preferably comprises some properties common to the structure element. These are CPT and INS identifying a basic occurrence in the structure element file. The accelerator element also comprises a property to ensure uniqueness (UNQ) in the case several basic occurrences can have the same attribute reference representation.

Other properties of the accelerator element are an index, IDX, preferably used to define several reference representations for a basic occurrence, and a property, ALT, preferably used to enable several alternative reference representations for a specific index to a basic occurrence. Finally the accelerator element contains an arbitrary number of properties, REF1-REFn, containing the references.

The properties of the accelerator element, preferred terms and field sequence are presented in the following table, where the format preferably can be numeric:

| Field# | Fieldname | Explanation |
|---|---|---|
| 1 | CPT | Concept |
| 2 | INS | Instance |
| 3 | IDX | Reference representation |
| 4 | ALT | Alternative reference representations |
| 5 | UNQ | Optional, to create uniqueness |
| 6 | REF1 | Reference #1 |
| 7 | REF2 | Reference #2 |
| ... | ... | ... |
| n + 5 | REFn | Reference #n |

Access Mechanisms for the Accelerator Element

There are several ways to retrieve individual elements in the accelerator element file as described above. One way, in the following called INDEX 1, is applying indirect retrieval using the vector {CPT, INS, IDX, ALT}, that is Field# 1, 2, 3 and 4. Another way, in the following called INDEX 2, is applying indirect retrieval using the vector {CPT, IDX, REF1, . . . , REFn, UNQ}, that is Field# 1, 3, 6, . . . , n+5 and 5.

The access mechanisms of the accelerator element have the following purpose: INDEX 1 connects a basic occurrence in the structure element file with one or more reference representations, while INDEX 2 is used for retrieving a basic occurrence in the structure file using a set of references.

An Example of Storing Data using the Invention

In the following an illustration of the storing method according to an embodiment of the invention is presented. The illustration was brought from an application being a platform for modelling business operations, that is a set of utilities used to implement tailor-made systems for administering business. The modelling is completely based on data.

Some predefined concepts used in the example are:

Constructor. A super-concept, from which all other concepts are created. That is, all other concepts are concept values (instances) of the super-concept, Constructor. All concepts have a number of predefined properties; e.g Data type, Data format, Redefine and a Bitmap property, holding, among other things, a bit denoting multiple attribute representation (repeating group). Constructor's Data type is Text. Hence all concepts (instances of Constructor) are presented with text.

Redefine. A concept with the property Redefine is a redefinition of another concept, that is, it shares its properties and value domain.

Data type. All concepts have a data type. There are two categories of data types: scalar and structure. "Numeric", "Date", "Date&Time" and "Boolean" are scalar. All scalar data are stored in fixed point numeric format. "Text", "Configuration" and "Record" are structures. Contents in scalar concepts are identified and interpreted by their instance numbers data format.

When assigning an attribute to a concept the understanding of the concept will increase from the point of view of content. The content of a structure-category concept is identified by its instance number, but it is interpreted differently. Text is interpreted through representation in the text element file. Configuration is interpreted through a subset of or all of its attributes, having the property "premise". Record is interpreted in an attribute context. Record is not represented in the example.

Data format. Scalar data format denotes the total number of integer and decimal digits in fixed point notation. This is illustrated only with the concept thickness (see below −0.5 mm is stored as 5). Instances of structure data have fixed format=8 digits. Text data is formatted with the maximum number of characters.

Function. Instances of Function are arithmetic or logic functions. The algorithm is described structurally using attributes. This is not illustrated in the example.

Premise. An attribute, being part of the identification set of attributes should have property Premise. Premise attributes are enumerated from 1 to n.

Concepts used in the example are;

Pressed plate, a user defined thin, form-cut and pattern pressed sheet of metal. Its Data type="Configuration". A Pressed plate is interpreted through its attributes: Plate type, Metal and Thickness. Plate type is user-defined with attributes Length, Width, Plate class and Standard thickness. The Standard thickness of a Pressed plate depends on Plate class and the Metal-value. A Metal has a Specific weight.

The application has a rather simple storing structure:

| Level 0 | | Level 1 | | Level 2 |
|---|---|---|---|---|
| Concept | -----> | Attribute | -----> | Property |
| | -----> | Property | | |

Concept is the highest level and can have one or more Attributes and/or one or more Properties. An Attribute can have one or more Properties. Attributes and Properties are references to Concepts. A Property imposes limitations on its Concept or Attribute (e.g. data type, the validity of a value . . . ).

To use the method according to the invention in a general manner, conventions for interpretation of predefined concepts and their values need to be clarified:

Concept: A numeric representation of a concept definition. In this data dictionary, a super-concept with text representation "Constructor" is defined. This super-concept is the basis for defining all other concepts. The super-concept, Constructor, has numeric representation 1 (one).

Instance: A numeric representation of contents associated with a Concept. Together Concept and Instance create a pair (Concept, Instance) being a self-contained information carrier in program systems using the method according to the invention. Examples: (1,10) and (10, 5). The interpretation of these pairs could be (1,10)=(Constructor, "Name") and (10,5)=(Name, "Adam"). In this data dictionary the interpretation of (Concept, Instance) is as follows: If Concept=1, that is the interpretation of Concept="Constructor", the pair is interpreted as a concept definition. If Concept>1 the pair is interpreted as concept content. Concept must be >0.

BasicData is a basic occurrence of a pair (Concept, Instance). In a structure element the BasicData is described using the vector: {OWN,ATR,SRT,CPT, INS}={0,0,0,Cpt,Ins} where Cpt>0, and is assigned a unique SID (structure element identifier). BasicData is level 0 in the element structure.

Attribute widens the contents of a basic occurrence. The Attribute structure element is described with the vector: {OWN,ATR,SRT,CPT,INS}={Own,Atr,Srt,RefCpt, RefIns} where Own>0, Atr>0, Srt>=0 and the pair (RefCpt,RefIns) can identify a basic occurrence (0,0, 0,RefCpt,RefIns). Attribute is level 1 in the element structure.

Property interprets and limits the validity of a basic occurrence or an attribute. Property is described in a structure element using the vector: {OWN,ATR,SRT, CPT,INS}={Own,0,0,PrpCpt,PrpIns} where OWN>0 and the pair(PrpCpt,PrpIns) point at the basic occurrence of (0,0,0,PrpCpt,PrpIns). Property is level 1 or 2 for the structure element. There are two categories of properties: Concept specific properties, being assigned contents when defining a concept, and instance specific properties, being assigned contents when assigning contents to the concept.

The application has about 50 predefined concepts. Other concepts are added when modeling the application (i.e. implementing the system).

The notation below complies with the formal description above. In this example the Data Dictionary structure elements for concept definitions are as follows:

| SID | OWN | ATR | SRT | CPT | INS | Explanation |
|---|---|---|---|---|---|---|
| 1 | 0 | 0 | 0 | 1 | 1 | Concept = Constructor: (Super-concept No.1) |
| 2 | 0 | 0 | 0 | 1 | 2 | Concept = Redefine: (Concept Redefinition - No.2) |
| 3 | 2 | 0 | 0 | 2 | 1 | Concept = Redefine PRP: Redefine = Concept |
| 4 | 0 | 0 | 0 | 1 | 8 | Concept = Data type - No.8 |
| 5 | 0 | 0 | 0 | 8 | 1 | Data type = Text |
| 6 | 0 | 0 | 0 | 8 | 2 | Data type = Numeric |
| 7 | 0 | 0 | 0 | 8 | 3 | Data type = Configuration |
| 8 | 4 | 0 | 0 | 8 | 1 | Concept = Data type PRP: Data type = Text |
| 9 | 1 | 0 | 0 | 8 | 1 | Concept = Concept PRP: Data type = Text |
| 10 | 0 | 0 | 0 | 1 | 9 | Concept = Format - No.9 |
| 11 | 0 | 0 | 0 | 1 | 19 | Concept = Function - No.19 |
| 12 | 11 | 0 | 0 | 8 | 1 | Concept = Function PRP: Data type = Text |
| 13 | 0 | 0 | 0 | 1 | 10 | Concept = Bitmap - No.10 |
| 14 | 0 | 0 | 0 | 1 | 30 | Concept = Premise - No.30 Concepts defined when modelling: |
| 20 | 0 | 0 | 0 | 1 | 301 | Concept = SpecificWeight No301 |
| 21 | 20 | 0 | 0 | 8 | 2 | Concept = SpecificWeight PRP: Data type = Numeric |
| 22 | 0 | 0 | 0 | 1 | 202 | Concept = Metal - No.202 |
| 23 | 22 | 0 | 0 | 8 | 1 | Concept = Metal PRP: Data type = Text |
| 24 | 22 | 1 | 0 | 1 | 301 | Concept = Metal ATR 1: Concept = SpecificWgt |
| 25 | 0 | 0 | 0 | 1 | 203 | Concept = Thickness |
| 26 | 25 | 0 | 0 | 8 | 2 | Concept = Thickness PRP: Data type = Numeric |
| 27 | 25 | 0 | 0 | 9 | 21 | Concept = Thickness PRP: Data format = 21 (ie 99.9) |
| 28 | 0 | 0 | 0 | 1 | 302 | Concept = StdThickness |
| 29 | 28 | 0 | 0 | 2 | 203 | Concept = StdThickness PRP: Redefine = Thickness |
| 30 | 0 | 0 | 0 | 1 | 303 | Concept = Width |
| 31 | 30 | 0 | 0 | 8 | 2 | Concept = Width PRP: Data type = Numeric |
| 32 | 0 | 0 | 0 | 1 | 304 | Concept = Length |
| 33 | 32 | 0 | 0 | 8 | 2 | Concept = Length |
| 34 | 0 | 0 | 0 | 1 | 305 | Concept = Plate class |
| 35 | 0 | 0 | 0 | 1 | 201 | Concept = Plate type |
| 36 | 35 | 0 | 0 | 8 | 1 | Concept = Plate type PRP: Data type = Text |
| 37 | 35 | 1 | 0 | 1 | 302 | Concept = Plate type ATR 1: Concept = StdThickn. |
| 38 | 37 | 0 | 0 | 1 | 19 | Concept = Plate type ATR 1: PRP: Concept = Function |
| 39 | 37 | 0 | 0 | 10 | 8 | Concept = Plate type ATR 1: PRP: BitMap = 8 (Mult atr) |
| 40 | 35 | 2 | 0 | 1 | 303 | Concept = Plate type ATR 2: Concept = Width |
| 41 | 35 | 3 | 0 | 1 | 304 | Concept = Plate type ATR 3: Concept = Length |
| 42 | 35 | 4 | 0 | 1 | 305 | Concept = Plate type ATR 4: Concept = Plate class |
| 43 | 0 | 0 | 0 | 1 | 101 | Concept = PressedPlate |
| 44 | 43 | 0 | 0 | 8 | 3 | Concept = PressedPlate PRP: Data type = Configuration |
| 45 | 43 | 1 | 0 | 1 | 201 | Concept = PressedPlate ATR 1: Concept = Plate type |
| 46 | 45 | 0 | 0 | 30 | 1 | Concept = PressedPlate ATR 1: PRP: Premise = 1 |
| 47 | 43 | 2 | 0 | 1 | 202 | Concept = PressedPlate ATR 2: Concept = Metal |
| 48 | 47 | 0 | 0 | 30 | 2 | Concept = PressedPlate ATR 2: PRP: Premise = 2 |
| 49 | 48 | 3 | 0 | 1 | 203 | Concept = PressedPlate ATR 3: Concept = Thickness |
| 50 | 49 | 0 | 0 | 30 | 3 | Concept = PressedPlate ATR 3: PRP: Premise = 3 |

The corresponding elements in the text element file, according to the invention, for the basic occurrences in the structure elements of the Data Dictionary above will be as shown in the table below:

| CPT | INS | IDX | ALT | UNQ | TXT |
|---|---|---|---|---|---|
| 1 | 1 | 0 | 0 | 0 | Concept |
| 1 | 8 | 0 | 0 | 0 | Data type |
| 8 | 1 | 0 | 0 | 0 | Text |
| 8 | 2 | 0 | 0 | 0 | Numeric |
| 8 | 3 | 0 | 0 | 0 | Configuration |
| 1 | 9 | 0 | 0 | 0 | Data Format |
| 1 | 19 | 0 | 0 | 0 | Function |
| 1 | 30 | 0 | 0 | 0 | Premise Defined when modelling: |
| 1 | 301 | 0 | 0 | 0 | Specific Weight |
| 1 | 202 | 0 | 0 | 0 | Metal |
| 1 | 203 | 0 | 0 | 0 | Thickness |
| 1 | 302 | 0 | 0 | 0 | Std Thickness |
| 1 | 303 | 0 | 0 | 0 | Width |
| 1 | 304 | 0 | 0 | 0 | Length |
| 1 | 305 | 0 | 0 | 0 | Plate class |
| 1 | 201 | 0 | 0 | 0 | Plate type |
| 1 | 101 | 0 | 0 | 0 | Pressed Plate |

Examples of elements of data in the structure element file, according to the invention, using the Data Dictionary as shown above are shown in the table below:

| SID | OWN | ATR | SRT | CPT | INS | Comment |
|---|---|---|---|---|---|---|
| 101 | 0 | 0 | 0 | 301 | 4 | Specific weight = 4 kg/dm3 |
| 102 | 0 | 0 | 0 | 301 | 8 | Specific weight = 8 kg/km3 |
| 103 | 0 | 0 | 0 | 202 | 1 | Metal = Stainless |
| 104 | 103 | 1 | 0 | 301 | 8 | Metal = Stainless ATR 1: Specific weight = 8 |
| 105 | 0 | 0 | 0 | 202 | 2 | Metal = Titanium |
| 106 | 105 | 1 | 0 | 301 | 4 | Metal = Titanium ATR 1: SpecificWeight = 4 |
| 107 | 0 | 0 | 0 | 203 | 5 | Thickness = 0.5 mm. |
| 108 | 0 | 0 | 0 | 203 | 6 | Thickness = 0.6 mm |
| 109 | 0 | 0 | 0 | 303 | 385 | Width = 385 mm |
| 110 | 0 | 0 | 0 | 303 | 505 | Width = 505 mm |
| 111 | 0 | 0 | 0 | 304 | 940 | Length = 940 mm |
| 112 | 0 | 0 | 0 | 304 | 1348 | Length = 1348 mm |
| 113 | 0 | 0 | 0 | 19 | 1 | Function = StdGX-05 |
| 114 | 0 | 0 | 0 | 19 | 2 | Function = StdGX-06 |
| 115 | 0 | 0 | 0 | 305 | 1 | Plate class = GX |
| 116 | 0 | 0 | 0 | 201 | 1 | Plate type = GX-26 |
| 117 | 116 | 1 | 1 | 302 | 5 | Plate type = GX-26 ATR 1: SRT 1: StdThickn = 0.5 mm |
| 118 | 117 | 0 | 0 | 19 | 1 | Platetype = GX-26 ATR 1: SRT 1: PRP Function = StdGX-05 |
| 119 | 116 | 1 | 2 | 302 | 6 | Plate type = GX-26 ATR 1: SRT 2: StdThickn = 0.6 mm |
| 120 | 119 | 0 | 0 | 19 | 2 | Plate type = GX-26 ATR 1: SRT 2: PRP: Function = StdGX-06 |
| 121 | 116 | 2 | 0 | 303 | 385 | Plate type = GX-26 ATR 2: Width = 385.mm |
| 122 | 116 | 3 | 0 | 304 | 940 | Plate type = GX-26 ATR 3: Length = 940 mm |
| 123 | 123 | 4 | 0 | 305 | 1 | Plate type = GX-26 ATR 4: Plate class = GX |
| 124 | 0 | 0 | 0 | 201 | 2 | Plate type = GX-42 |
| 125 | 124 | 1 | 1 | 302 | 5 | Plate type = GX-42 ATR 1: SRT 1: StdThickn = 0.5 mm |
| 126 | 125 | 0 | 0 | 19 | 1 | Plate type = GX-42 ATR 1: SRT 1: PRP: Function = StdGX-05 |
| 127 | 124 | 1 | 2 | 302 | 6 | Plate type = GX-42 ATR 1: SRT 2: StdThickn = 0.6 mm |
| 128 | 127 | 0 | 0 | 19 | 2 | Plate type = GX-42 ATR 1: SRT 2: PRP: Function = StdGX-06 |
| 129 | 124 | 2 | 0 | 303 | 385 | Plate type = GX-42 ATR 2: Width = 385 mm |
| 130 | 124 | 3 | 0 | 304 | 1348 | Plate type = GX-42 ATR 3: Length = 1348 mm |
| 131 | 124 | 4 | 0 | 305 | 1 | Plate type = GX-42 ATR 4: Plate class = GX |
| 132 | 0 | 0 | 0 | 101 | 1 | PressedPlate = 1 (GX-26, Stainless, 0.5 mm) |
| 133 | 132 | 1 | 0 | 201 | 1 | PressedPlate = 1 ATR 1: Plate type = GX-26 |
| 135 | 132 | 2 | 0 | 202 | 1 | PressedPlate = 1 ATR 2: Metal = Stainless |
| 137 | 132 | 3 | 0 | 203 | 5 | PressedPlate = 1 ATP 3: Thickness = 0.5 mm |
| 139 | 0 | 0 | 0 | 101 | 2 | PressedPlate = 2 (GX-42, Stainless, 0.5 mm) |
| 140 | 139 | 1 | 0 | 201 | 2 | PressedPlate = 2 ATR 1: Plate type = GX-42 |
| 142 | 139 | 2 | 0 | 202 | 1 | PressedPlate = 2 ATR 2: Metal = Stainless |
| 143 | 139 | 3 | 0 | 203 | 5 | PressedPlate = 2 ATR 3: Thickness = 0.5 mm |

The corresponding elements in the text element file, according to the invention, of basic occurrences in the structure elements as above will be as shown in the following table:

| CPT | INS | IDX | ALT | UNQ | TXT |
|---|---|---|---|---|---|
| 202 | 1 | 0 | 0 | 0 | Stainless |
| 202 | 2 | 0 | 0 | 0 | Titanium |
| 19 | 1 | 0 | 0 | 0 | StdGX-05 |
| 19 | 2 | 0 | 0 | 0 | StdGX-06 |
| 201 | 1 | 0 | 0 | 0 | GX-26 |
| 201 | 2 | 0 | 0 | 0 | GX-42 |
| 305 | 1 | 0 | 0 | 0 | GX |

The corresponding elements in the accelerator file, according to the invention, of basic occurrences in the structure elements as above will be as shown in the following table:

| CPT | INS | IDX | ALT | UNQ | REF 1 | REF 2 | REF 3 | TXT |
|---|---|---|---|---|---|---|---|---|
| 101 | 1 | 30 | 0 | 0 | 1 | 1 | 5 | PressedPlate GX-26, Stainless, 0.5 mm |
| 101 | 2 | 30 | 0 | 0 | 2 | 1 | 5 | PressedPlate GX-42, Stainless, 0.5 mm |

This application of the accelerator elements has the objective of fast retrieval of basic occurrences using the Premises (IDX=30). The index becomes unique without using UNQ, whereas UNQ=0.

Find below a logical presentation of portions of the database above concerning Pressed plate GX-42 (column header SID Nos 139-143, 113-114, 115, 124-131, 103-112 and 101-102):

| Concept | -> | Attribute | -> | Property |
|---|---|---|---|---|
| (PressedPlate, 2) | -> | (Platetyp, "GX-42") | | |
| | -> | (Metal, "Stainless") | | |
| | -> | (Thickness, 0.5) | | |
| (Platetype, "GX-42") | -> | (StdThickn, 0.5) | -> | (Function, "StdGX-05") |
| | -> | (StdThickn, 0.6) | -> | (Function, "StdGX-06") |
| | -> | (Width, 385) | | |
| | -> | (Length, 1348) | | |
| | -> | (Plate class, "GX") | | |
| (Function, "StdGX-05") | -> | Not specified in the example | | |
| (Function, "StdGX-06") | -> | Not specified in the example | | |
| (Plate class, "GX") | | | | |
| (Metal, "Stainless") | -> | (SpecificWeight, 8) | | |
| (Metal, "Titanium") | -> | (SpecificWeight, 4) | | |
| (Thickness, 0.5) | | | | |
| (Thickness, 0.6) | | | | |
| (Width, 385) | | | | |
| (Width, 505) | | | | |
| (Length, 940) | | | | |
| (Length, 1348) | | | | |
| (SpecificWeight, 4) | | | | |
| (SpecificWeight, 8) | | | | |

Instances of Pressed plate are interpreted via the contents of the premise attributes of Pressed plate, that is, the contents of Plate type, Metal and Thickness. Instances of Plate type and Metal are interpreted via their text elements. Instances of Thickness are interpreted via the Data format of Thickness.

(Function, "StdGX-05") is part of the domain of rules. It governs the selection of plate thickness. Example: (Function, "StdGx-05")–([Metal] EQUAL "Stainless") (Function, "StdGX-06")–([Metal] NOT EQUAL "Stainless").

The notation {Metal} is interpreted as "the content of the concept Metal in the current context".

The quantity Metal in a Pressed plate, can be calculated by a numeric (Function, "Plate weight"): {SpecificWeight}*{Thickn}*{Width}*{Length}.

Example of a Physical Implementation of the Method.

In the example above the three elements, according to the method of an embodiment of the invention, are implemented in a file system labelled "Index Sequential Access Method" (ISAM). The implementation uses only a small part of the facilities of the file system. Generally, the requirements of the technique are that the file system can store and sort alphanumeric and numeric data. In addition the file system needs to allow two index files connected with each data file, and each index containing up to 16 data fields. Below follows an example how the storing preferably can be accomplished.

The structure elements are stored in three physical files; a data file, STRUCTUR.DAT, and two associated index files, STRUCTUR.IX1 and STRUCTUR.IX2, together constituting the structure element file. The data file sorts the elements by the property SID, being a number identifying an element uniquely. This order of elements is denoted INDEX 0 for the structure elements. In this file system SID is a number indicating the position of the element (the record) in the data file, and is not stored as part of the element.

The two index files contain INDEX 1 and INDEX 2 as defined for the structure element. The index files are maintained automatically by the file system. In this file system, numeric data is stored in BCD-format (Binary Coded Decimal), and alphanumeric data in ASCII-format.

The structure file can preferably be dimensioned for 99,999,999 structure elements. The formats of the properties of the structure element file are:

STRUCTUR/SID: Integer (NumeriC identification not being stored)

STRUCTUR/OWN: 8 BCD-digits (4 bytes)

STRUCTUR/ATR: 2 BCD-digits (1 byte)

STRUCTUR/ALT: 6 BCD-digits (3 bytes)

STRUCTUR/CPT: 4 BCD-digits (2 bytes)

STRUCTUR/INS: 12 BCD-digits (6 bytes)

BCD is the storing format of the structure element properties. However, any sortable numeric format can be used. The field sizes of the properties are governed by the requirements of the application. Essential for choosing format and field sizes is minimising the secondary storage space used by each structure element. It should be adjusted to the block size of the storage device.

As all properties are defined as integers, the application using the structure element needs to interpret the numeric contents to other scalar types (Date, ASCII, Boolean, Numeric etc). The interpretation is governed by a "Data Dictionary", itself stored as structure elements.

The text elements are stored in three physical files; one data file, TEXT.DAT, and two associated index files, TEXT.IX1 and TEXT.IX2, together constituting the text element file.

The two index files contain INDEX 1 and INDEX 2 as defined for the text element. The index files are maintained automatically by the file system.

The text file can preferably be dimensioned for 1,000,000 elements. The formats of the properties of the text element are:

TEXT/CPT: 4 BCD-digits (2 bytes)

TEXT/INS: 12 BCD-digits (6 bytes)

TEXT/IDX: 2 BCD-digits (1 byte)

TEXT/ALT: 2 BCD-digits (1 byte)

TEXT/UNQ: 8 BCD-digits (4 bytes)

TEXT.TXT: 50 ASCII-characters (50 bytes)

The size of the text field is a compromise considering the size requirements of the text representations and minimising the space requirements of the text elements. The block size used by this file system is a multiple of 64 bytes. The definitions also need to consider index limitations of the file system.

The accelerator elements are stored in three physical files; a data file, ACCEL.DAT, and two associated index files, ACCEL.IX1 and ACCEL.IX2, together constituting the accelerator element file. The two index files contain INDEX 1 and INDEX 2 as defined for the accelerator element. The index files are maintained automatically by the file system.

The accelerator file is preferably dimensioned for 1,000, 000 elements. The format of the properties of the accelerator element are:

ACCEL/CPT: 4 BCD-digits (2 bytes)

ACCEL/INS: 12 BCD-digits (6 bytes)

ACCEL/IDX: 2 BCD-digits (1 byte)

ACCEL/ALT: 2 BCD-digits (1 byte)

ACCEL/UNQ: 8 BCD-digits (4 bytes)

ACCEL/REF01: 8 BCD-digits (4 bytes)

ACCEL/REF02: 8 BCD-digits (4 bytes)

ACCEL/REF03: 8 BCD-digits (4 bytes)

ACCEL/REF04: 8 BCD-digits (4 bytes)

ACCEL/REF05: 8 BCD-digits (4 bytes)

ACCEL/REF06: 8 BCD-digits (4 bytes)

ACCEL/REF07: 8 BCD-digits (4 bytes)

ACCEL/REF08: 8 BCD-digits (4 bytes)

ACCEL/REF09: 8 BCD-digits (4 bytes)

ACCEL/REF10: 8 BCD-digits (4 bytes)

ACCEL/REF11: 8 BCD-digits (4 bytes)

ACCEL/REF12: 8 BCD-digits (4 bytes)

The number of reference fields in the element limits the number of properties that can be used in a compound retrieval. In the example above, the accelerator element corresponds to an index definition with up to 12 properties. The application using the file definition uses maximum 11 of the references.

Specialized Physical Implementation of the Method

The elements have a fixed logical structure. However, they are flexible considering format and field property dimensioning. Defining element files requires only a small number of parameters influencing needs for secondary storage space and effectivity of the file system.

As the structural connection between element properties is predefined, general methods for maintenance and retrieval of data in the physical files can be specified.

Specifying a file system suiting the elements and an interface defined by standard methods for maintenance and retrieval of data in the element files together with a cache-system optimising the use of secondary and primary storage, considerable effectivity improvements can be achieved. If such a file system is adjusted to and included in an operating system, additional effectivity improvements can be achieved.

The elements can store any type of data. One advantage of selecting a standardised method for storing all types of data is that a combination of customised electronic devices and standardised software in several layers can create a common platform for all types of storing and retrieval needs.

The method according to an embodiment of the invention is universally applicable. Hence, it enables storing any type or structure of data. The method is based on the fact that structure elements are self-contained carriers of information, represented by a pair: concept and concept value, and context information adherent to it.

According to an embodiment of the invention, data can be organised in hierarchies of structure elements of arbitrary depth and complexity. In spite of its simplicity, the method can reflect connection, context and meaning, however complex, irrespective of types of data and how complex the relations between data may be. Hence, the method represents a fundamental framework for standardised physical data storage of all types of data.

The method according to an embodiment of the invention can be implemented in virtually any reasonably advanced ISAM-file system, or another suitable commercially available file system, or a file system developed and dedicated to this purpose.

The invention has now been described above with a preferred embodiment. However, it is obvious that many variations of it can be implemented. As an example, it is possible to employ more, other and even fewer fields in the structure element, the text element and/or the accelerator element. It is also possible to use only the structure element, and not use the text element or the accelerator element. Further, it is possible to define different fields, as for example the identification, differently from what has been described above. Such and other kindred variations must be seen as comprised by the invention as defined by the appended claims.

The invention claimed is:

1. A method for storing data, comprising:
   organising data in structure elements, which are stored in a database file, each structure element including two property fields interpreted as concept and concept value and the concept characterizes the concept value;
   assigning a structure element an identification property field enabling unique identification of the structure element, and assigning the structure element at least three position property fields defining a relation between the structure element and another structure element; and
   retrieving the data based on at least one of a group including the identification property field, the at least three position property fields and the two property fields,
   wherein one position property field governs vertical relations between structure elements, thereby creating hierarchic relations between structure elements, and
   wherein the other two position property fields govern ordering of structure elements in hierarchic relations.

2. A method according to claim 1, wherein the one position property field that governs vertical relations is assigned a value of the identification property of a structure element, with which said structure element is connected.

3. A method according to claim 1, wherein the other two position property fields that govern ordering between structure elements in hierarchic relations are interpreted respectively as attribute and attribute value ordering, allowing several different values of an attribute relating to another structure element.

4. A method according to claim 1, comprising the further step, for at least some of the elements in the structure element file, of storing, in a text element file, the properties, identifying a basic occurrence of the structure element file, together with a text property containing a text representation of at least a part of the information in a corresponding basic occurrence in the structure element file.

5. A method according to claim 4, wherein text elements further comprise a property distinguishing several text elements and preferably containing 0 or the identifying property of the corresponding basic occurrence.

6. A method according to claim 5, wherein the text elements further comprise an interpretation property defining how to interpret a text representation.

7. A method according to claim 6, wherein the text elements further comprise an interpretation alternative property defining alternative text representations of an interpretation.

8. A method according to claim 4, wherein text elements further comprise an interpretation property defining how to interpret a text representation.

9. A method according to claim 8, wherein the text elements further comprise an interpretation alternative property defining alternative text representations of an interpretation.

10. A method according to claim 4, wherein rules concerning selection of structure elements to have text representation are predefined in software using the elements.

11. A method according to claim 4, wherein rules concerning selection of structure elements to have text representation are defined dynamically supported by software using the elements.

12. A method according to claim 1, comprising the further step, for at least some of the elements in the structure element file, of storing, in an accelerator element file, the properties, identifying a basic occurrence of the structure element file, together with at least one reference property, intended to contain some data from the structure element hierarchy of said basic occurrence.

13. A method according to claim 12, wherein the accelerator element further comprises a distinguishing property.

14. A method according to claim 13, wherein the distinguishing property contains 0 or the identifying property of a corresponding basic occurrence in the structure element file.

15. A method according to claim 13, wherein the accelerator element further comprises an interpretation property, defining how to interpret the accelerator representation.

16. A method according to claim 15, wherein the accelerator element further comprises an interpretation alternative property, providing for alternative accelerator representations for a certain interpretation.

17. A method according to claim 12, wherein the accelerator element further comprises an interpretation property, defining how to interpret accelerator representation.

18. A method according to claim 17, wherein the accelerator element further comprises an interpretation alternative property, providing for alternative accelerator representations for a certain interpretation.

19. A method according to claim 12, wherein rules concerning selection of structure elements to have data stored as references in the accelerator element file are predefined in software using the elements.

20. A method according to claim 12, wherein rules concerning selection of structure elements to have data stored as references in the accelerator element file are defined dynamically supported by software using the elements.

21. A computer-readable medium including executable instructions stored therein, which when executed by a computer system, causes the computer system to function as a database system having the following data structure comprising:
   a database file storing data organised in structure elements, each of the structure elements comprising two property fields interpreted as concept and concept value and the concept characterizes the concept value, wherein the structure elements are assigned an identification property field enabling unique identification of a structure element, and at least three position property fields defining a relation between the structure element and another structure element,
   wherein one position property field governs vertical relations between structure elements, thereby creating hierarchic relations between structure elements, and
   wherein the other two position property fields govern the ordering of the structure elements in hierarchic relations.

22. The computer-readable medium of claim 21, wherein the one position property field that governs vertical relations is assigned a value of the identification property of a structure element, with which said structure element is connected.

23. The computer-readable medium of claim 21, wherein a the other two position property fields that govern ordering between structure elements in hierarchic relations are interpreted respectively as attribute and attribute value ordering, allowing several different values of an attribute relating to another structure element.

24. The computer-readable medium of claim 21, further comprising the step, for at least some of the elements in the structure element file, of storing, in a text element file, the properties, identifying a basic occurrence of the structure element file, together with a text property containing a text representation of at least a part of the information in a corresponding basic occurrence in the structure element file.

25. The computer-readable medium of claim 24, wherein text elements further comprise a property distinguishing several text elements.

26. The computer-readable medium of claim 25, wherein the distinguishing property contains 0 or the identifying property of the corresponding basic occurrence in the structure element file.

27. The computer-readable medium of claim 25, wherein the text elements further comprise an interpretation property defining how to interpret a text representation.

28. The computer-readable medium of claim 24, wherein text elements further comprise an interpretation property defining how to interpret a text representation.

29. The computer-readable medium of claim 24, wherein rules concerning selection of structure elements to have text representation are predefined in software using the elements.

30. The computer-readable medium of claim 24, wherein rules concerning selection of structure elements to have text representation are defined dynamically supported by software using the elements.

31. The computer-readable medium of claim 21, further comprising the step, for at least some of the elements in the structure element file, of storing, in an accelerator element file, the properties, identifying a basic occurrence of the structure element file, together with at least one reference property, intended to contain some data from the structure element hierarchy of the said basic occurrence.

32. The computer-readable medium of claim 31, wherein the accelerator element further comprises a distinguishing property.

33. The computer-readable medium of claim 32, wherein the distinguishing property contains 0 or the identifying property of a corresponding basic occurrence in the structure element file.

34. The computer-readable medium of claim 31, wherein the accelerator element further comprises an interpretation property, defining how to interpret accelerator representation.

35. The computer-readable medium of claim 31, wherein rules concerning selection of structure elements to have data stored as references in the accelerator element file are predefined in software using the elements.

36. The computer-readable medium of claim 31, wherein rules concerning selection of structure elements to have data stored as references in the accelerator element file are defined dynamically supported by software using the elements.

37. The computer-readable medium of claim 31, wherein the accelerator element further comprises an interpretation property, defining how to interpret the accelerator representation.

38. A method for creating a data model, comprising:
   entering data into self-contained information carriers each including a concept and concept value, the concept characterizing the concept value;
   assigning each of the self-contained information carriers an identification property enabling unique identification;
   assigning each of the self-contained information carriers at least three position properties to establish relations between the self-contained information carriers; and
   creating a data model using the self-contained information carriers and context information held by the at least three position properties.

39. The method of claim 38, wherein the data entered into the self-contained information carriers and the context information held by the at least three position properties are provided by an end-user.

40. The method of claim 38, wherein the at least three position properties include one position property governing vertical relations between self-contained information carriers, thereby creating hierarchic relations between the self-contained information carriers, and two other position properties governing ordering of self-contained information carriers in hierarchic relations.

41. The method of claim 38, further comprising:
   retrieving the data based only on the identification property assigned to each of the self-contained information carriers.

42. The method of claim 38, further comprising:
   retrieving the data based on at least one of the concept, concept value and at least three position properties.

43. The method of claim 38, further comprising:
   retrieving the data based on at least two of a group, which includes the concept, the concept value and the at least three position properties, and the ordering of the at least two of the group.

* * * * *